No. 611,545. Patented Sept. 27, 1898.
J. F. YARNALL.
SLATE.
(Application filed June 2, 1897.)
(No Model.)
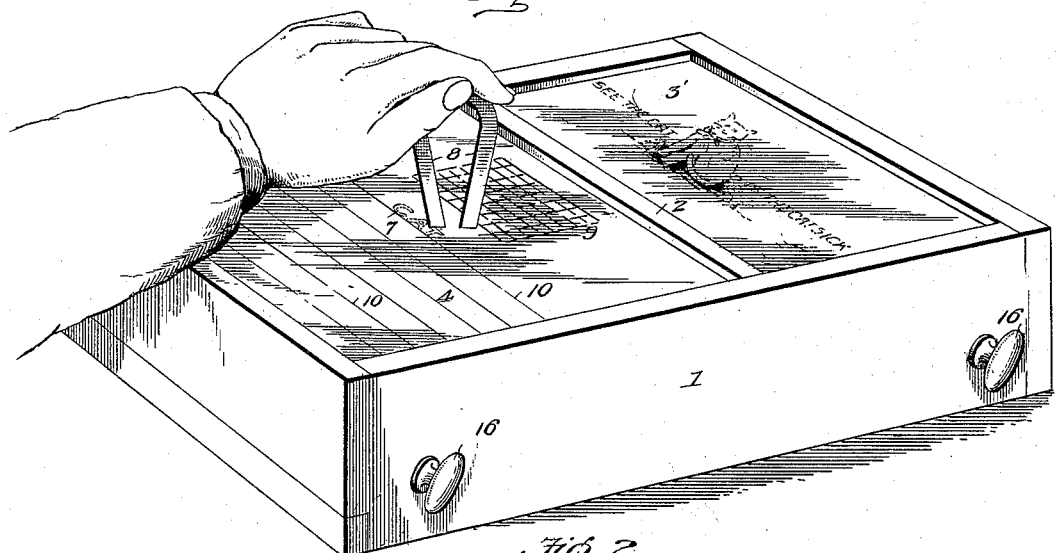
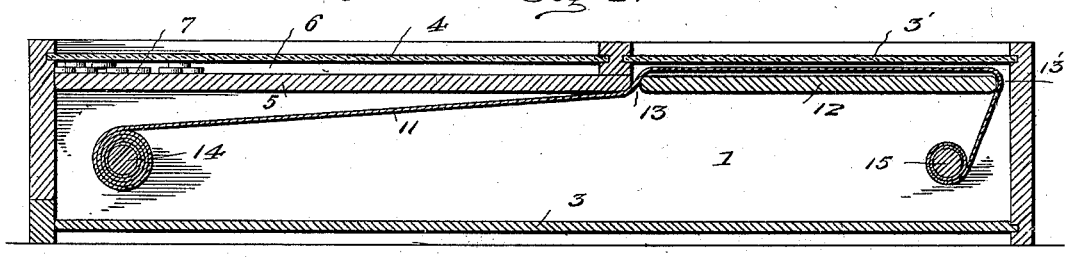
Witnesses: John F. Yarnall, Inventor
THE NORRIS PETERS CO., PHOTO-LITHO., WASHINGTON, D. C.

UNITED STATES PATENT OFFICE.

JOHN F. YARNALL, OF ALTOONA, PENNSYLVANIA.

SLATE.

SPECIFICATION forming part of Letters Patent No. 611,545, dated September 27, 1898.

Application filed June 2, 1897. Serial No. 639,166. (No model.)

*To all whom it may concern:*

Be it known that I, JOHN F. YARNALL, a citizen of the United States, residing at Altoona, in the county of Blair and State of Pennsylvania, have invented certain new and useful Improvements in Slates; and I do hereby declare the following to be a full, clear, and exact description of the invention, such as will enable others skilled in the art to which it appertains to make and use the same.

My invention relates to an educational toy designed to afford instruction and amusement to children in teaching them drawing and spelling and also to afford entertainment to older persons in instructing the children; and the object of the invention is to provide a simple and inexpensive novelty in which a variety of subjects are presented for the consideration and instruction of the pupil in the arts of drawing and spelling, as well as in playing games.

In the preferred embodiment of my invention I construct a casing in a peculiar way to accommodate two panes of glass or equivalent material and a continuous film or carrier on which is provided the subjects of study, the whole so arranged that the pictures or other objects on the film or carrier may be exposed successively beneath one of the glass panes, the same being a frosted or ground glass to serve the purpose of a drawing-slate. Adjacent to this drawing-surface is the plain glass top or other material, beneath which is a platform or partition that sustains a number of objects made of magnetizable substances or of compositions capable of attraction by a magnet, which is provided for use by the pupil, who can move the magnet over the glass pane to attract the magnetizable objects— such, for example, as the letters to make a word appropriate to the subject to be drawn on the slate.

Of course it is to be understood that my invention is not to be restricted to the employment of letters made of magnetic material nor to the use of any particular material as the magnetic medium, because any appropriate material may be used and any object may be provided, such as letters, figures, straight or curved rods, squares, geometrical figures, or other objects which may be grouped, assembled, or combined to induce or promote study; and the invention further consists in the novel construction and combination of parts which will be hereinafter fully described and claimed.

To enable others to understand my invention, I have illustrated the preferred embodiment thereof in the accompanying drawings, forming a part of this specification, and in which—

Figure 1 is perspective view of my educational toy, illustrating the employment of a magnet to adjust the magnetic objects to form a word appropriate to the study from which the pupil can make a tracing on the drawing-surface. Fig. 2 is a longitudinal sectional view taken centrally through the toy. Fig. 3 is a detail view of a number of the magnetic objects which may be used in the toy.

Like numerals of reference denote corresponding parts in all the figures of the drawings, referring to which—

1 designates the inclosing case, which is made of appropriate dimensions to contain the operative elements of the toy. The top of the case is open, except that it has a cross bar or rail 2 at the proper distance from one end to separate the plain and ground glass panes from each other, and the case has a removable bottom 3, or one of the sides may be opened for the purpose of obtaining access to the interior of the case to introduce the film or carrier therein or to store the magnet in the case to prevent its loss when the toy is not used.

3' designates the pane of frosted or ground glass, which constitutes the drawing or tracing surface of the toy, and 4 is the plain glass top or other transparent material. I prefer to make the ground glass smaller than the plain glass top 4; but this is optional, and the two panes 3 4 are secured in the upper edges of the case 1 in any suitable way, but they are divided or separated by the cross-rail 2.

Beneath the plain glass cover 4 is a partition or platform 5, which serves as the means for supporting in close relation to the cover 4 the magnetic objects, which are placed in a compartment or chamber 6, which is formed by and between the partition 5, the cover 4, and the walls of the case 1. The magnetic objects are designated at 7, and they are made of metal or composition to be attracted by a magnet, such as a horseshoe magnet, (indicated at 8.) The magnetic objects may be made of steel, tin, steel filings, united by an adhesive agent, such as glue, and the objects may be made by stamping or pressing them or, if a composition, by molding them. The objects may consist of letters of the alphabet, figures, geometrical figures, or of any other character suitable to form words, phrases, or produce an outline of the study. If desired, the objects may be made by stamping out square pieces of magnetic material and cementing thereto slips of paper bearing a letter, figure, &c.

From the foregoing it will be apparent that I do not restrict my invention to any particular form the magnetic object may take nor to the material employed. In fact, the partition 5 may have its surface inscribed or otherwise provided with a game-board, such as a checker-board, as indicated at 9, and suitable pieces of magnetic material representing the different sets of men used in checkers may be employed to enable a game to be played, or another kind of game may be used. The partition 5 may also have the guides 10 provided on its exposed face to serve as a guide in placing or grouping the letters to form a word or the like.

The objects should not be as thick as the depth of the chamber 7, so that an object attracted by the magnet against the lower face of the cover 4 may be moved to the desired position on the partition without substantially disturbing the objects which lie out of the field of the magnetic attraction of the magnet-poles.

The film or carrier 11 is conducted beneath the ground-glass drawing-surface 3, and to present the pictures or inscriptions on this carrier in close relation to the drawing-surface 3 I employ a guide board or plate 12, which is fastened in the case 1 in close relation to said ground glass 3. This guide board or plate is fastened in the case to leave the openings or slots 13 13', one of which slots 13 separates the guide-board 12 from the partition 5, and the other slot 13' is between the ends of the guide board or plate 12 and the wall of the case 1, adjacent thereto. The ends of this film or carrier are attached to spools or spindles 14 15, which are journaled within the case 1 near the respective ends of the same and below the partition 5 and the guide-board 12, the spindle or spool 14 lying nearly in vertical alinement with the slot 13'.

The film or carrier may be wound on one spool and unwound from the other spool, or vice versa, and said spools have exposed knobs 16, by which either spool may be conveniently rotated by hand to coil the film or carrier on the spool thus rotated and to unwind the film or carrier from the idle spool. The film passes from the spool 15 through the slot 13', over the edge of the guide-board 12, and between said guide-board and the ground glass, thence through the slot 13, and thence to and around the spool 14, and the picture or other matter on the face of that section of the film or carrier above the guide-board is exposed to view through the ground glass 3, to which glass the exposed part of the film or carrier is held in close relation by said guide-board, so as to enable the student to readily observe the picture, &c., on the film or carrier.

The carrier or film may be made of paper, fabric, or any other suitable material, or it may be of fabric, with the pictures, &c., secured thereto. The pictures or studies may be of any kind calculated to excite and hold the interest of the pupil, and each picture preferably contains descriptive matter appropriate to the subject thereof.

The method of using my toy is as follows: One of the spools is rotated to draw the carrier endwise and adjust one study beneath the ground glass. The pupil makes a tracing or drawing of the picture on the ground glass by the aid of a pencil and then takes the magnet in hand and selects from the mass of indiscriminately assembled or grouped objects in the chamber 7 the letters appropriate to form the word contained in the descriptive matter on the study, said letters being arranged on the guide-lines on the partition 5. This use of the toy is calculated to instruct a child in drawing and spelling, besides proving very entertaining and amusing. It is obvious that a game of checkers may also be played by the aid of magnets in the hands of the players, or that the geometrical objects may be assembled together to form figures or structures somewhat similar to building-blocks, &c.

In the practical embodiment of my invention I prefer to provide a plain white surface at a suitable place on the continuous film or carrier, so that the latter may be adjusted to bring the plain white surface below the drawing-slate, in order to show to view more clearly the tracing or drawing made on the slate by the pupil.

Having thus fully described my invention, what I claim as new, and desire to secure by Letters Patent, is—

As an article of manufacture, the educational toy comprising a single frame or casing provided with a cross bar or rail, the transparent and ground-glass panes arranged in the same horizontal plane within, and secured to, the frame and its cross-bar, the partition or platform 5, arranged beneath the transparent pane, magnetizable objects thereon, and guide-board 12 also secured so as to form the slot 13 between the end of the board and the cross-bar and the slot 13' between the end of the board and top wall of the frame, the spools journaled within the casing below the guide-board and the partition and provided with exposed knobs, the film or carrier passing from one spool through the slot 13 over the guide-board, beneath the ground-glass pane and through the slot 13' to the other spool, and a magnet, substantially as described.

In testimony whereof I affix my signature in presence of two witnesses.

JOHN F. YARNALL.

Witnesses:
E. M. THOMAS,
O. F. DELO.